US008352053B2

(12) United States Patent
Terada

(10) Patent No.: US 8,352,053 B2
(45) Date of Patent: Jan. 8, 2013

(54) AUDIO SIGNAL PROCESSING SYSTEM

(75) Inventor: Kotaro Terada, Hamamatsu (JP)

(73) Assignee: Yamaha Corporation (JP)

( * ) Notice: Subject to any disclaimer, the term of this patent is extended or adjusted under 35 U.S.C. 154(b) by 1271 days.

(21) Appl. No.: 12/014,999

(22) Filed: Jan. 16, 2008

(65) Prior Publication Data

US 2008/0175398 A1 Jul. 24, 2008

(30) Foreign Application Priority Data

Jan. 18, 2007 (JP) ................................ 2007-008861

(51) Int. Cl.
*G06F 17/00* (2006.01)
*G05B 15/00* (2006.01)

(52) U.S. Cl. ............. 700/94; 700/83; 715/275; 715/967

(58) Field of Classification Search .................... 700/94, 700/83; 715/727, 275, 716, 762, 765, 768, 715/771, 864, 965, 967

See application file for complete search history.

(56) References Cited

U.S. PATENT DOCUMENTS 7,571,014 B1 * 8/2009 Lambourne et al. ............ 700/94

FOREIGN PATENT DOCUMENTS

JP 2002-304173 A 10/2002

OTHER PUBLICATIONS

Yamaha, "DME32 Owner's Manual", 2000, Yamaha, pp. iii, 2-4, 10, 11, 26, 30, 31, and 80-83.*

Adobe, "Adobe Audition User Guide", 2003, Adobe, pp. 218, 219, 263, 264.*

* cited by examiner

*Primary Examiner* — Jesse Elbin

(74) *Attorney, Agent, or Firm* — Rossi, Kimms & McDowell LLP

(57) ABSTRACT

An audio signal-processing system has signal-processing units connectable to a transmission line. Each signal-processing unit has channels for applying a signal process to input audio signals. A control unit is connectable to the transmission line for operating a target channel belonging to one of the signal-processing units. The control unit has color pallets different from each other and previously selected in correspondence to the signal-processing units. When the control unit detects an instruction to display an operation screen of the target channel, the control unit renders the operation screen of the target channel using the color pallet corresponding to the signal-processing unit to which the target channel belongs, so that a background color of the operation screen of the target channel displayed on a display part of the control unit is different from a background color of an operation screen of another channel belonging to another signal-processing unit.

8 Claims, 8 Drawing Sheets

| PALLET NO.1 | | PALLET NO.2 | | PALLET NO.3 | |
|---|---|---|---|---|---|
| COLOR NO. | ACTUAL COLOR | COLOR NO. | ACTUAL COLOR | COLOR NO. | ACTUAL COLOR |
| 0 | BLACK | 0 | BLACK | 0 | BLACK |
| 1 | WHITE | 1 | WHITE | 1 | WHITE |
| 2 | GRAY 1 | 2 | PINK 1 | 2 | AQUA 1 |
| 3 | GRAY 2 | 3 | PINK 2 | 3 | AQUA 2 |
| 4 | RED | 4 | RED | 4 | RED |
| 5 | BLUE | 5 | BLUE | 5 | BLUE |
| ... | ... | ... | ... | ... | ... |

FIG.6
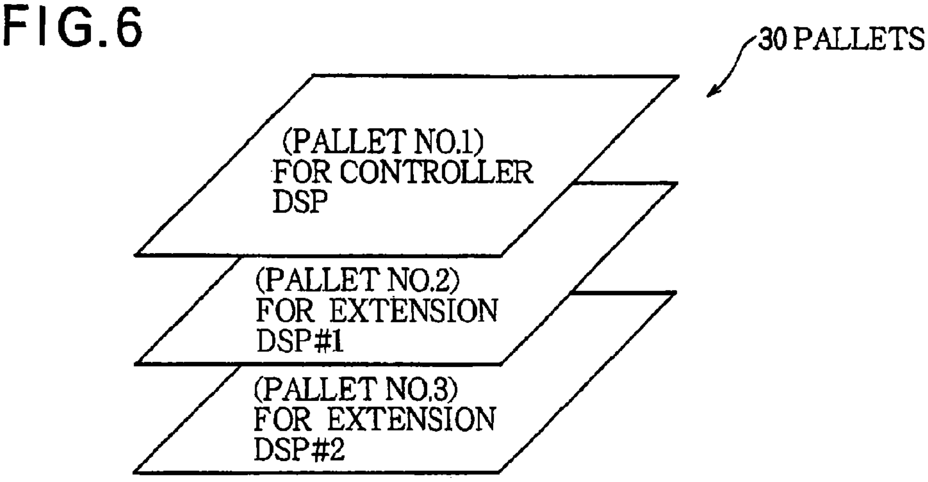
FIG.7
| PALLET NO.1 | | PALLET NO.2 | | PALLET NO.3 | |
|---|---|---|---|---|---|
| COLOR NO. | ACTUAL COLOR | COLOR NO. | ACTUAL COLOR | COLOR NO. | ACTUAL COLOR |
| 0 | BLACK | 0 | BLACK | 0 | BLACK |
| 1 | WHITE | 1 | WHITE | 1 | WHITE |
| 2 | GRAY 1 | 2 | PINK 1 | 2 | AQUA 1 |
| 3 | GRAY 2 | 3 | PINK 2 | 3 | AQUA 2 |
| 4 | RED | 4 | RED | 4 | RED |
| 5 | BLUE | 5 | BLUE | 5 | BLUE |
| ... | ... | ... | ... | ... | ... |
FIG.8
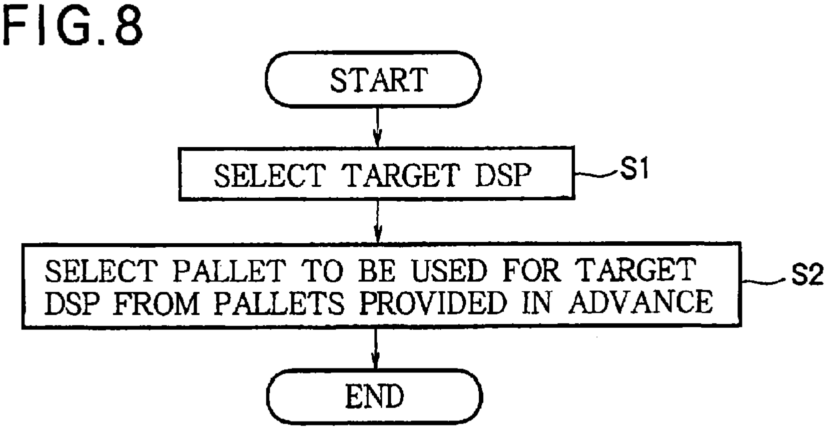

AUDIO SIGNAL PROCESSING SYSTEM

This application claims the benefit of Japanese Patent Application No. 2007-008861, filed Jan. 18, 2007, the content of which is hereby incorporated by reference in its entirety.

BACKGROUND OF THE INVENTION

1. Technical Field

The present invention relates to an audio signal processing system including a plurality of signal processing units and a control unit for controlling the signal processing units.

2. Related Art

Conventionally, a mixer is well known which adjusts levels and frequency characteristics of audio signals output from a large number of microphones or electric or electronic musical instruments or the like, then mixes the audio signals into several mixing groups, and transmits the mixing groups to a power amplifier. As this mixer, there is known a mixing system including a console section and an engine section connected to the console section through a communication line. In general, in the mixer, the console section is installed in an area of audience seats apart from a stage or in a mixer room provided behind the audience seats, and the engine section connected to the console section is provided in the vicinity of the stage. An operator operating the mixing console operates various panel operating pieces provided on the mixing console to adjust the volume and tone of each audio signal of an instrumental sound or a singing voice such that the resultant signal most properly expresses the musical performance. The engine section has a function for processing audio signals and has a plurality of microphone/line input channels as input signal systems. The engine section programs and mixes the input signal systems, and outputs a plurality of output channels serving as output signal systems.

In general, signals on the input channels of the input signal systems are amplified by a head amplifier and then output to a mixing processing section. Then, the mixing processing section adjusts the frequency characteristics and levels of the amplified signals on the respective input channels and mixes these signals in a programmed combination. Then, the resulting mixed signals are each set by an output fader to a desired output level and are output to one of the output channels.

In the conventional mixing system in which the communication line is connected between the engine section and the console section, the engine section for performing a mixing process may be installed in the vicinity of the stage and the console section may be installed in the area of the audience seats, such that a mixing operation may be performed while checking sound being listened to by the audience. Moreover, since microphone/line signals are input to the engine section for the mixing process installed in the vicinity of the stage, its cables can be easily laid or handled. Such a mixing system is disclosed for example in JP-A-2002-304173.

In the conventional mixing system, one engine section is connected to the console section. However, there has been proposed an audio signal processing system such as the mixing system in which a plurality of signal processing units for processing audio signals are connected to a transmission line, and a control unit connected to the transmission line controls the plurality of signal processing units. In this audio signal processing system, audio signals can be processed while increasing the desired number of channels by connecting the plurality of signal processing units to the transmission line even if the number of channels being processed in one signal processing unit is limited. The control unit performs an operation for setting parameters of each channel or the like in each signal processing unit. At this time, an operation screen is displayed on a display part of the control unit. On the operation screen, the operation for setting the parameters of each channel or the like in each signal processing unit is performed. When this operation is performed, a signal processing unit serving as an operation target needs to be specified. However, since the same operation screen is rendered commonly for any signal processing unit selected as a current operation target, the signal processing unit selected as the current operation target would be identified by reading character string information of a name, a number, or the like of the signal processing unit rendered on an upper or lower part of the operation screen.

However, a character string displayed on the operation screen should be carefully checked to specify the signal processing unit selected as the current operation target. However, there is a problem in that the character string may not easily specify the operation target since the character string is not a conspicuous indication.

SUMMARY OF THE INVENTION

Therefore, an object of the present invention is to provide an audio signal processing system that can intuitively specify a signal processing unit selected as an operation target without reading a character string on an operation screen.

To accomplish the above object, an audio signal processing system of the present invention has the most important feature that a control unit performs a process of rendering an operation screen of a channel selected as an operation target based on a color pallet which is provided for one signal processing unit to which the target channel belongs and which is different from another color pallet of another signal processing unit, when the control unit detects an instruction to display the operation screen of the channel selected as the operation target.

According to the present invention, when the control unit detects an instruction to display an operation screen of a channel serving as an operation target, the control unit performs a process of rendering the operation screen of the channel serving as the operation target based on a color pallet different from that of another signal processing unit, such that a hue or color tone of the operation screen is made unique according to the signal processing unit to which the target channel belong and therefore the signal processing unit serving as the operation target can be intuitively specified by viewing only the hue or background color of the operation screen without reading a character string of the operation screen.

BRIEF DESCRIPTION OF THE DRAWINGS

FIG. 6 is a view showing a configuration of pallets when a user selects different color pallets for signal processing units in the audio signal processing system of the present invention.

FIG. 7 is a view showing an example of a table of Pallet No. 1-No. 3 shown in FIG. 6 for use in the audio signal processing system of the present invention.

FIG. 8 is a flowchart of a pallet selection process executed in the audio signal processing system of the present invention.

DETAILED DESCRIPTION OF THE INVENTION

Figure 1:
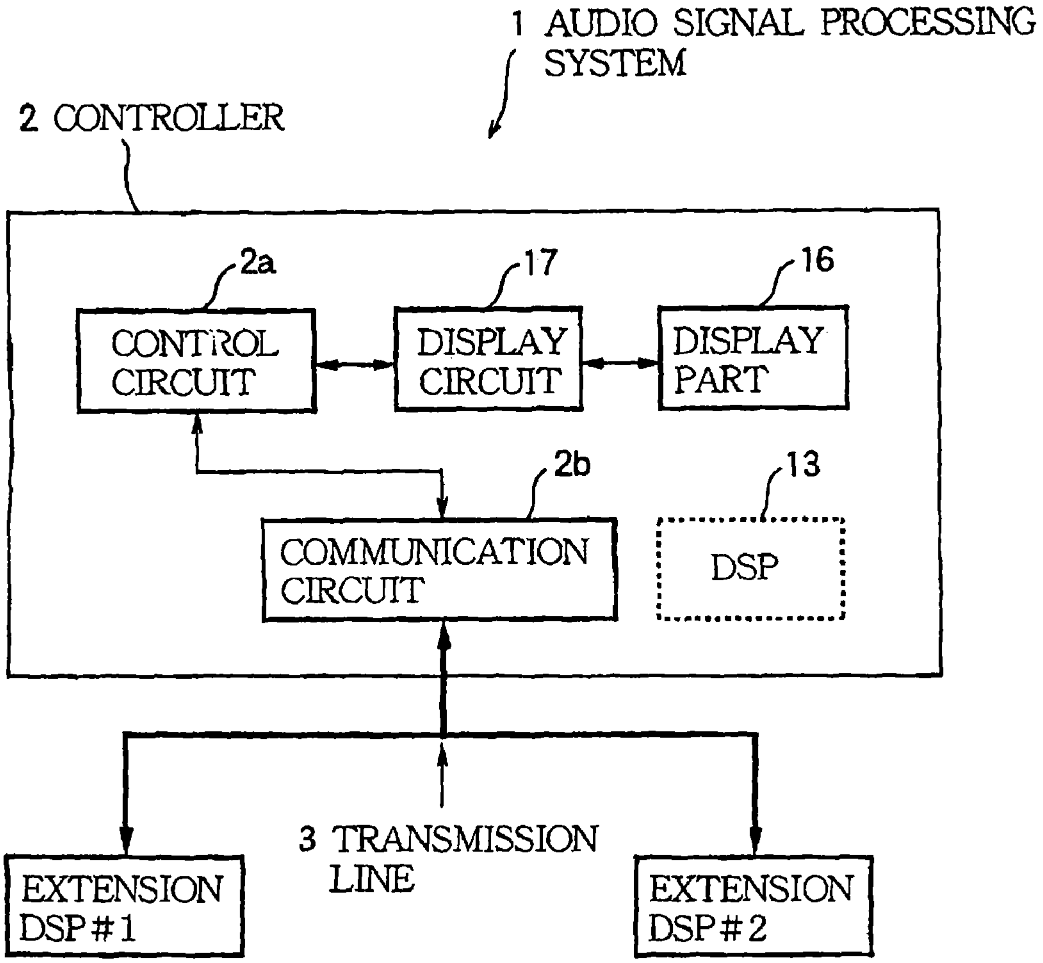
FIG. 1 is a block diagram showing a schematic configuration of an audio signal processing system according to an embodiment of the present invention.

FIG. 1 is a block diagram showing a schematic configuration of an audio signal processing system 1 according to an embodiment of the present invention.

The audio signal processing system 1 shown in FIG. 1 includes a transmission line 3 and a network in which a controller 2, an extension DSP#1, and an extension DSP#2 are configured to connect to the transmission line 3. The extension DSP#1 and the extension DSP#2 serving as signal processing units have a digital signal processor (DSP) for processing audio signals of a plurality of channels, and have a plurality of microphone inputs serving as input signal systems or a plurality of input channels through the transmission line 3, and perform signal processing for programming and mixing the input signal systems and outputting the audio signals to a plurality of output channels serving as output signal systems. Moreover, the controller 2 serving as a control unit can control signal processing of the extension DSP#1 and the extension DSP#2 by outputting control signals to the transmission line 3, such that various operations of the extension DSP#1 and the extension DSP#2 are performed.

The controller 2 includes a communication circuit 2*b* having a communication interface for transmitting or receiving a control signal or audio signal configured by packet data with the transmission line 3, a control circuit 2*a* having a CPU for controlling the overall parts of the controller 2, and a display circuit 17 for displaying an operation screen on a display part 16 having a liquid crystal display panel when the extension DSP#1 and the extension DSP#2 are operated. Moreover, the controller 2 can also have an internal DSP 13 for processing audio signals of a plurality of channels like the extension DSP#1 or the extension DSP#2. In this case, the DSP 13 can have a plurality of microphone inputs serving as input signal systems or a plurality of input channels through the transmission line 3, and perform signal processing for programming and mixing the input audio signals and outputting the resultant audio signals through a plurality of output channels serving as output signal systems. Signal processing of the internal DSP 13 can be controlled by the control circuit 2*a* incorporated in the controller 2. In addition, the number of channels whose signals can be processed in the DSP 13 is, for example, 96, the number of channels whose signals can be processed in the extension DSP#1 is, for example, 48, and the number of channels whose signals can be processed in the extension DSP#2 is, for example, 48. In the audio signal processing system 1, a mixing process for a total of 192 channels or the like can be performed.

Figure 2:
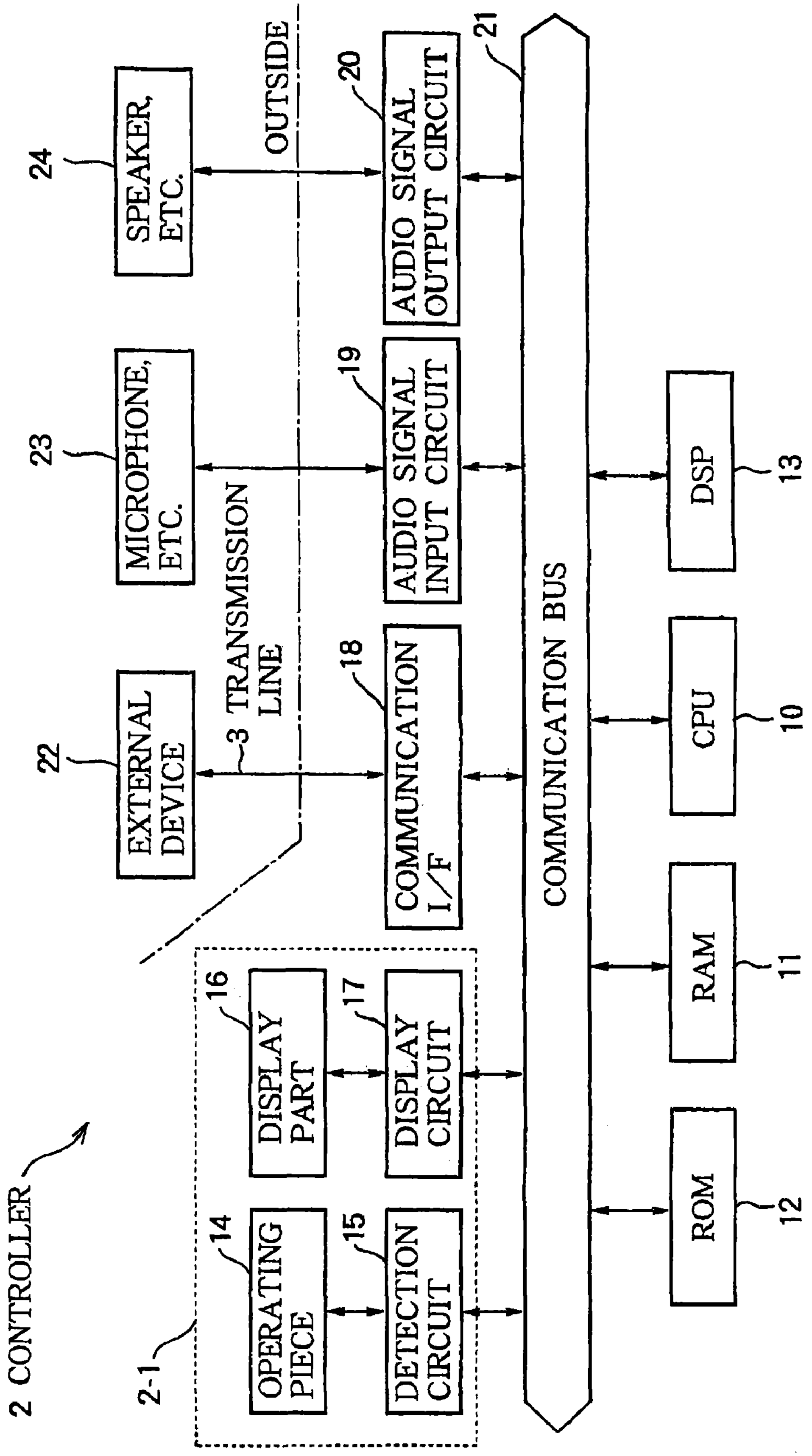
FIG. 2 is a block diagram showing a detailed configuration of a controller in the audio signal processing system of the present invention.

Next, FIG. 2 is a block diagram showing a detailed configuration of the controller 2.

In FIG. 2, a central processing unit (CPU) 10 controls the overall operation of the audio signal processing system 1, and executes operating software of a rendering program for displaying an operation screen on the display part 16, a control program for controlling the signal processing units of the extension DSP#1, the extension DSP#2, and the DSP 13, or the like. A work area of the CPU 10 or a storage area of various data is set in a random access memory (RAM) 11. At least the operating software of the rendering program or control program executable in the CPU 10 or the like is stored in a read only memory (ROM) 12. The ROM 12 serves as a writable ROM of a flash memory or the like, such that the operating software is writable and a version of the operating software can be readily upgraded. As described above, the DSP 13 is the internal signal processing unit for processing audio signals of a plurality of channels like the extension DSP#1 or the extension DSP#2.

A detection circuit 15 detects an event of an operating piece 14 by scanning the operating piece 14 such as a panel operating piece or the like, and outputs an event signal corresponding to the operating piece 14 in which the event has occurred. The operating piece 14 includes a large number of operating pieces to regulate equalizing and pan characteristics of each channel or to switch a scene. A display circuit 17 has the display part 16 of a liquid crystal display (LCD) or the like. When parameters of each channel or the like belonging to the DSP 13, the extension DSP#1, and the extension DSP#2 serving as the signal processing units are operated, an operation screen capable of performing various settings or the like is displayed on the display part 16. For the various settings, a user can perform a setting operation on the operation screen using a graphical user interface (GUI). A communication interface (I/F) 18 is an interface for connecting the controller 2 to the transmission line 3 serving as a communication network of a local area network (LAN), the Internet, a telephone line, or the like, and is logically connected to an external device 22 serving as the extension DSP#1 and the extension DSP#2 when a connection to the communication network is established.

Accordingly, a packet of a control signal or audio signal can be sent from the controller 2 to the external device 22 through the transmission line 3, and the audio signal packet output from the external device 22 can be received. An audio signal input circuit 19 inputs an audio signal from an input section 23 such as a microphone for inputting an external sound or the like to the controller 2. An audio signal output circuit 20 outputs an audio signal, processed in a mixing process or the like, output from the controller 2 to an output section 24 of an external speaker, such that a sound is output. These sections are connected to a communication bus 21 to receive and transmit data through the communication bus 21.

Moreover, the extension DSP#1 and the extension DSP#2 do not have an operating piece or display part for a simplified configuration, and its configuration is similar to the controller 2, but precludes a configuration 2-1, as surrounded by the dotted line, containing the operating piece 14, the detection circuit 15, the display part 16, and the display circuit 17 in the controller 2. When the extension DSP is connected to the transmission line 3, a logical connection to an extension DSP corresponding to the external device 22 from the controller 2 or the local device is established through the communication I/F 18 and the transmission line 3.

Figure 3:
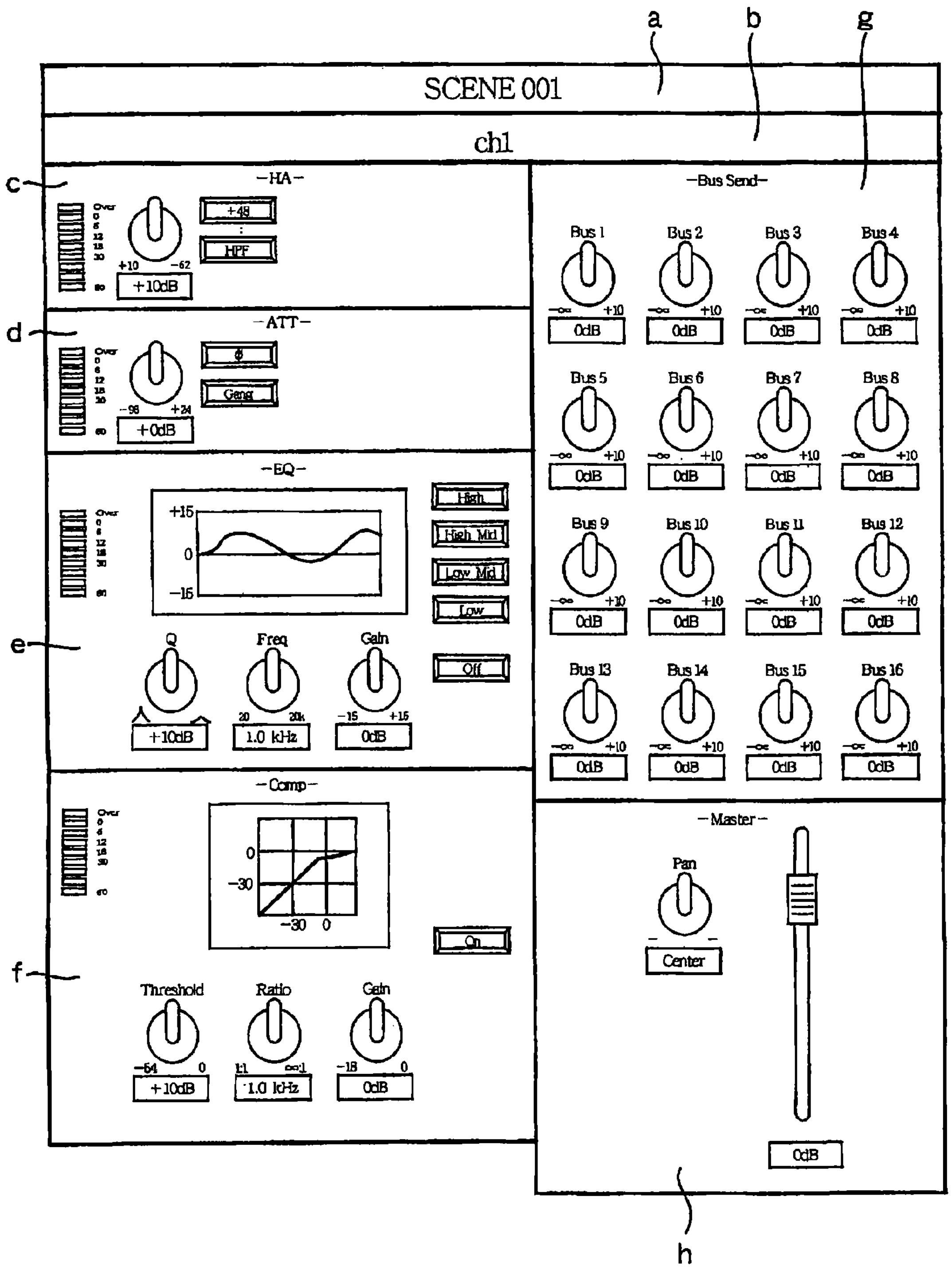
FIG. 3 is a view showing an operation screen of a channel selected as an operation target displayed on a display part in the audio signal processing system of the present invention.
Figure 4:
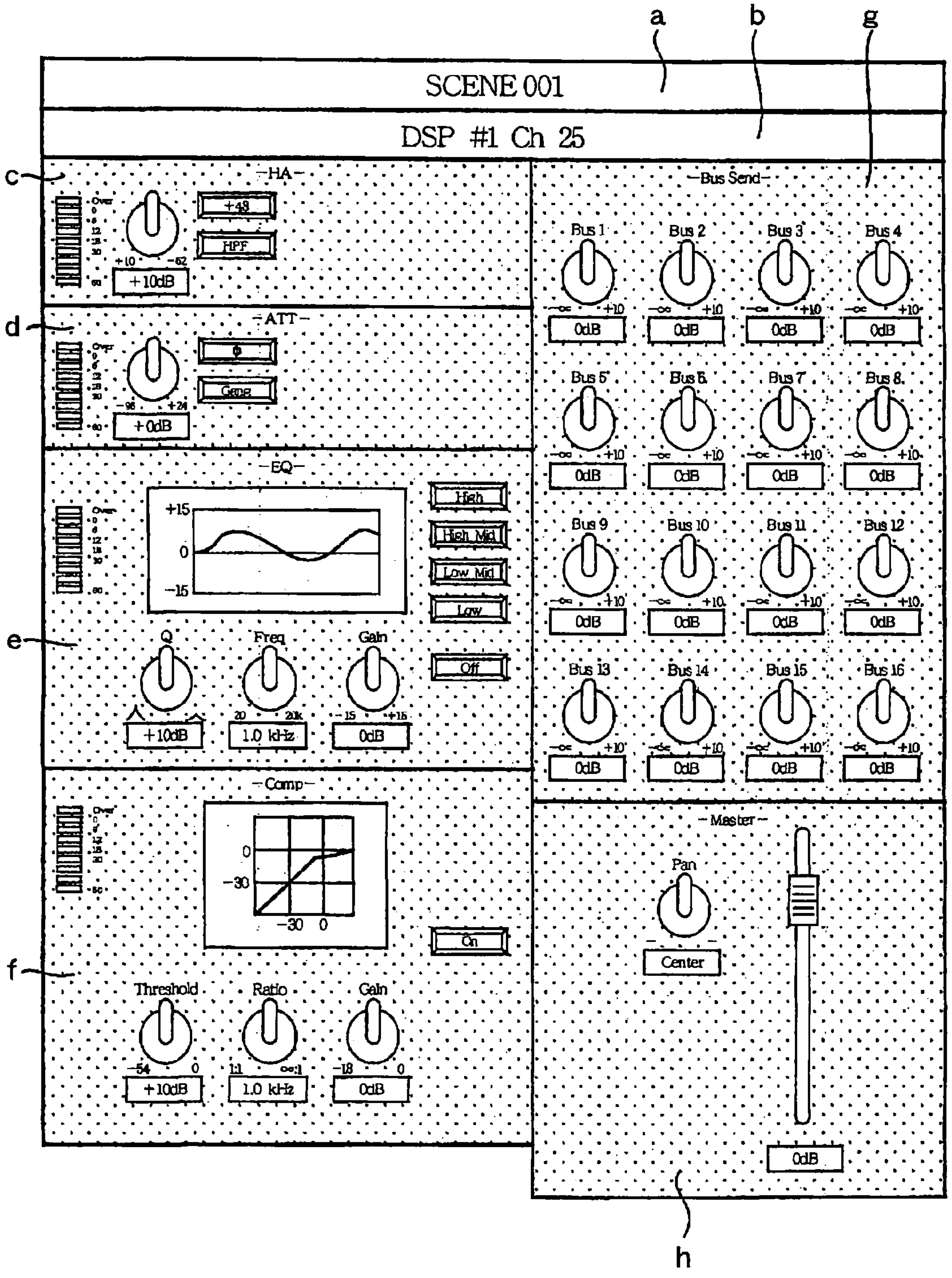
FIG. 4 is a view showing an operation screen of another channel selected as an operation target displayed on the display part in the audio signal processing system of the present invention.

Next, FIGS. 3 and 4 show an operation screen of a channel selected as an operation target displayed on the display part 16 when an instruction is made to render the operation screen of the channel selected as the operation target in the controller 2. FIG. 3 is an operation screen in which a channel selected as an operation target belongs to the DSP 13, and FIG. 4 is another operation screen in which a channel belonging to the extension DSP#1 is selected as an operation target.

The operation screen shown in FIG. 3 is rendered in case that, for example, a first channel (Ch1) of 96 channels belonging to the DSP 13 is the operation target. The operation screen shown in FIG. 4 is that in which, for example, a 25-th channel (DSP#1 Ch25) of 48 channels belonging to the extension DSP#1 is the operation target. Referring to FIGS. 3 and 4, it is obvious that the configurations of the operation screens shown in FIGS. 3 and 4 are the same, but the operation screen in which the channel selected as the operation target belongs to the DSP 13 and the operation screen in which the channel selected as the operation target belongs to the extension DSP #1 have different hues dependently on areas in the display part 16. In this case, the hues of a common area set for each operation screen, an area of a knob and button to be operated by the user, and an area for displaying a graph are invariable, and the hue of a background portion except these areas is variable. Accordingly, a channel belonging to a signal processing unit can be identified by viewing only the hue (back ground color) of an operation screen of the channel. Moreover, an operation screen in which, for example, one channel of 48 channels belonging to the DSP#2 is selected as the operation target is similar to those shown in FIGS. 3 and 4, and has a different hue from those of the DSP 13 and the extension DSP#1.

To change the hue of each signal processing unit and display an operation screen on the display part 16, the user previously selects different color pallets for the DSP 13, the extension DSP#1, and the extension DSP#2. FIG. 6 shows a configuration of pallets 30 when the user selects different color pallets for the signal processing units. As shown in FIG. 6, the pallets 30 include three pallets of Pallet No. 1-Pallet No. 3. Pallet No. 1 is used for the controller DSP serving as the DSP 13, Pallet No. 2 is used for the extension DSP#1, and Pallet No. 3 is used for the extension DSP #2.

In the operation screens shown in FIGS. 3 and 4, a top area a is specified as a common area in every operation screen for displaying a scene number. For example, the scene number is SCENE 001.

Each scene number is set to a file name of a scene memory area storing scene data serving as operation data for performing a mixing process for scenes. An area b is an area for displaying a channel number. In FIG. 3, "Ch1" is displayed. In FIG. 4, "DSP#1 Ch25" is displayed. An area c is an area for displaying a knob and buttons for setting a gain of a head amplifier (HA) and setting filter switching, and a level meter. An area d is an area for displaying a knob and buttons for setting a gain of an attenuator (ATT), switching a phase and switching a gang function, and a level meter. An area e is an area for displaying knobs for adjusting Q for setting frequency characteristics of a gain in an equalizer (EQ), buttons for switching a frequency range to be displayed, a level meter, and a frequency characteristic graph.

An area f is an area for displaying knobs for adjusting a threshold level, a ratio, and a gain to set a gain characteristic in a compressor (Comp), an ON/FF button, and a level meter. An area g is an area for displaying knobs for setting transmission levels (Bus Send), for example, in respective 16 MIX buses Bus 1-Bus 16. An area h is an area for displaying a fader for adjusting a master level and a knob for adjusting a pan. Among the above-described various areas, areas whose hues are invariable even when a signal processing unit selected as an operation target is changed are the common area, includes the area of the knobs, fader and buttons to be operated by the user in the areas c to h, and the graph area in the areas e and f in the operation screens shown in FIGS. 3 and 4.

FIG. 7 shows an example of the table of Pallet No. 1-No. 3 in the pallets 30 shown in FIG. 6. Pallet No. 1-No. 3 shown in FIG. 7 forms the table including a color number (Color No.) field and an actual color field. Specific color numbers are designated to the areas a-h of the operation screen. Color numbers designated to the areas a-h are common between the pallets. For example, in Pallet No. 1-No. 3, "Color No. 1" is designated to the area a, "Color No. 2" is designated to the area b, . . . .

In Pallet No. 1, the actual color of "Color No. 0" is "Black", the actual color of "Color No. 1" is "White", the actual color of "Color No. 2" is "Gray 1", the actual color of "Color No. 3" is "Gray 2", the actual color of "Color No. 4" is "Red", the actual color of "Color No. 5" is "Blue", . . . .

In Pallet No. 2, the actual color of "Color No. 0" is "Black", the actual color of "Color No. 1" is "White", the actual color of "Color No. 2" is "Pink 1", the actual color of "Color No. 3" is "Pink 2", the actual color of "Color No. 4" is "Red", the actual color of "Color No. 5" is "Blue", . . . . In Pallet No. 3, the actual color of "Color No. 0" is "Black", the actual color of "Color No. 1" is "White", the actual color of "Color No. 2" is "Aqua 1", the actual color of "Color No. 3" is "Aqua 2", the actual color of "Color No. 4" is "Red", the actual color of "Color No. 5" is "Blue", . . . .

In Pallet No. 1-No. 3 as described above, the same colors are assigned to "Color No. 0", "Color No. 1", "Color No. 4", and "Color No. 5". These color numbers are designated to the common area for each of the operation screens, is the area of the knobs, fader and buttons to be operated by the user, and the graph area. When "Color No. 2" and "Color No. 3" are designated for the background of the operation screen, the hue of the common area is invariable and only the background hue is variable in the displayed operation screen of the target signal processing unit to which a different pallet number is designated.

Figure 5:
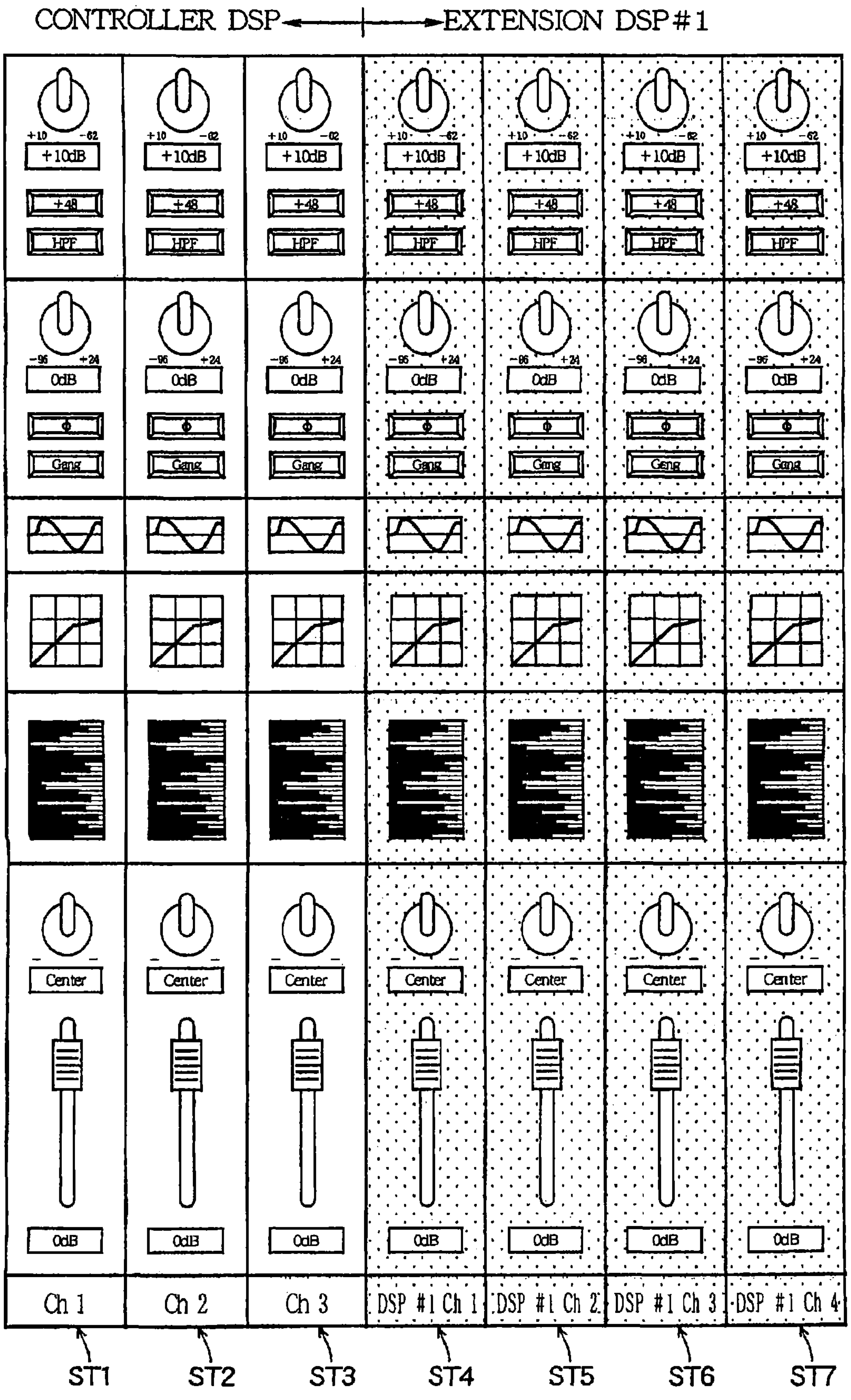
FIG. 5 is a view showing an operation screen of a plurality of channels displayed on the display part in the audio signal processing system of the present invention.

In FIGS. 3 and 4, there is shown an operation screen of a channel selected as an operation target displayed on the display part 16. An operation screen of a plurality of channels can be displayed on the display part 16. When an instruction is made to render a multi-channel operation screen, an example of displaying an operation screen of seven channels on the display part 16 is shown in FIG. 5. In the operation screen shown in FIG. 5, for example, a first channel (Ch1) of 96 channels belonging to the DSP 13 is displayed as a channel strip ST1, a second channel (Ch2) is displayed as a channel strip ST2, and a third channel (Ch3) is displayed as a channel strip ST3. For example, a first channel (DSP#1 Ch1) of 48 channels belonging to the extension DSP#1 adjacent to the third channel (Ch3) belonging to the DSP 13 is displayed as a channel strip ST4, and a second channel (DSP#1 Ch2), a third channel (DSP#1 Ch3), and a fourth channel (DSP#1 Ch4) are respectively displayed as ST5, ST6, and ST7.

The channel strips ST1-ST7 are configured with the area for adjusting the head amplifier, the area for adjusting the attenuator, the area of the graph representing the frequency characteristic of the equalizer, the area representing the gain characteristic of the compressor, the area of the level meter representing a plurality of predetermined frequency levels, and the area for adjusting the master level and the pan, from the top to the bottom. In this case, as shown in FIG. 6, the pallets 30 have Pallet No. 1 for the control DSP serving as the DSP 13, Pallet No. 2 for the extension DSP#1, and Pallet No. 3 for the extension DSP#2. In the respective areas of the operation screen, a common color number is designated in Pallet No. 1-No. 3. In the channel strip, the actual colors of the color numbers designated to the common area, the area of the knobs and buttons to be operated by the user, and the area for displaying the graph are equally designated even when the pallet number is changed. Accordingly, in the case of the channel strip belonging to the DSP 13 and the case of channel strip belonging to the DSP#1, the background hues of the displayed channel strips are variable according to associated signal processing units as shown in FIG. 5. However, in the channel strips, the hues of the common area made common to the respective channels, the area of the knobs, fader and buttons to be operated by the user, and the graph area are invariable.

Next, FIG. 8 is a flowchart showing a pallet selection process in which the user designates a color pallet for each signal processing unit.

When the user makes an operation for designating a color pallet for a signal processing unit, the controller 2 detects this operation, such that the pallet selection process is started and a signal processing unit (DSP) serving as a target is selected by the user in step S1. Next, in step S2, the user selects a pallet number to be used for the signal processing unit (DSP) serving as the target in step S1 from a plurality of pallets having pallet numbers provided in advance, such that the pallet selection process is completed.

In this case, in terms of the pallets having the pallet numbers, a maker of the controller 2 creates several pallets and pallet numbers are assigned to the created pallets. In this regard, alternatively the user can create in advance pallets, assign pallet numbers to the created pallets, and store the pallets in a storage means provided in the controller 2. By selecting the pallets for the signal processing units, the pallets 30 are constructed as shown in FIGS. 6 and 7.

Figure 9:
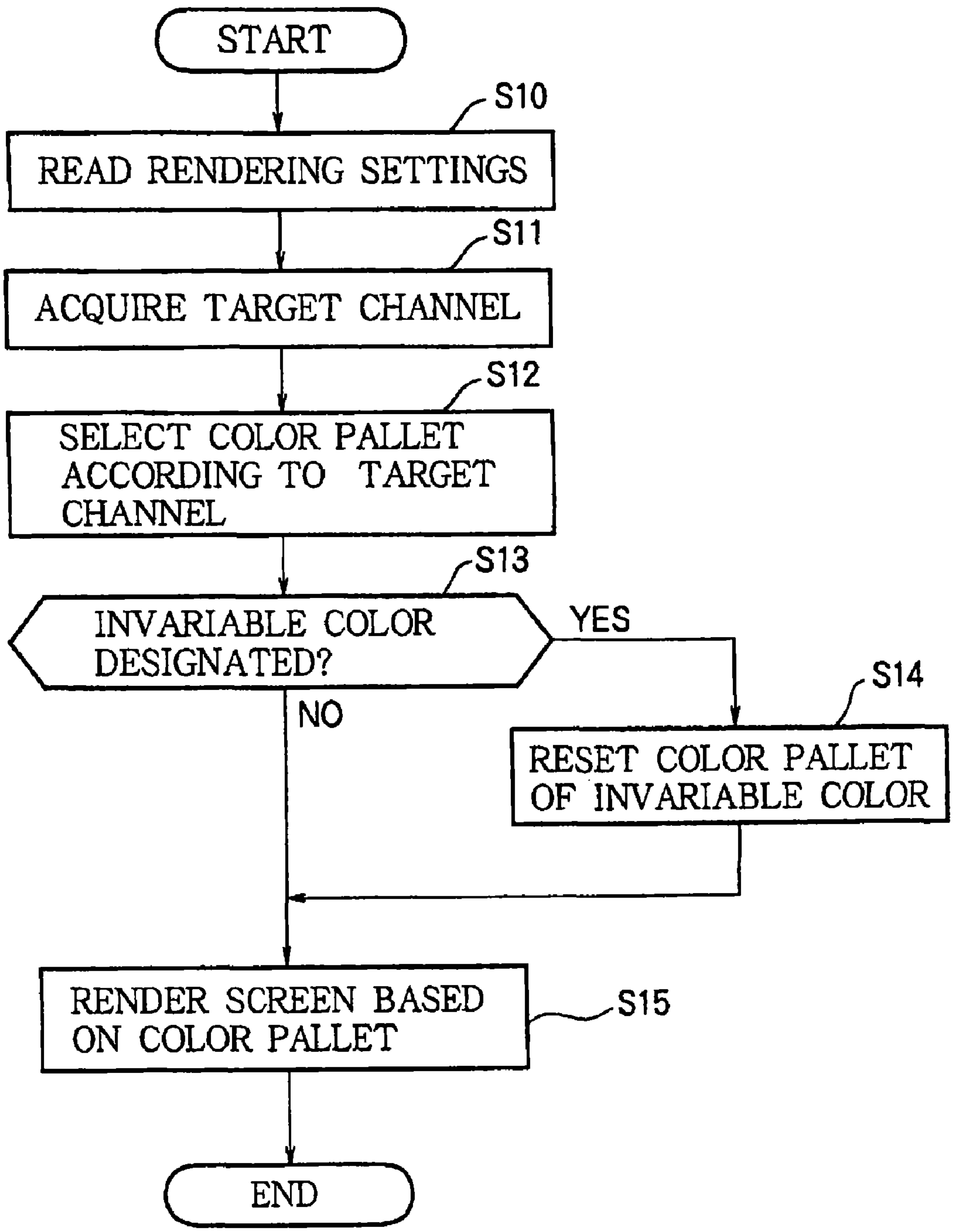
FIG. 9 is a flowchart of a target channel rendering process executed in the audio signal processing system of the present invention.

Next, FIG. 9 is a flowchart of a selected channel rendering process to be executed by detecting an instruction in the controller 2 when a channel serving as an operation target is selected and the instruction to render its operation screen is made by the user. In the selected channel rendering process, the operation screen of the channel serving as the operation target is displayed on the display part 16 as shown in FIGS. 3 and 4. Before the channel serving as the operation target is selected, the pallet selection process shown in FIG. 8 is executed and the user designates a color pallet for each signal processing unit.

When the instruction to render the operation screen of the channel serving as the operation target is detected, the selected channel rendering process is started. Rendering settings is read which indicate whether the hue is invariable according to color pallet information designated for each signal processing unit in association with the respective areas of the operation screen in step S10. In the rendering settings, an area whose hue is set invariable can be expressed by a combination of a pallet number and a color number in the pallets 30. Next, in step S11, information of the channel serving as the operation target is acquired as the target channel.

In step S12, a color pallet of a pallet number designated to a signal processing unit to which the channel serving as the operation target belongs is selected. In step S13, it is determined whether or not a color number of an invariable color is designated in the selected color pallet in the rendering settings. Upon determining that the color number of the invariable color is designated, it branches to step S14 to reset the color pallet information (or actual color) of the color number designated to the invariable color in the selected color pallet to default color pallet information, and then proceeds to step S15. Upon determining that the color number of the invariable color is not designated, step S15 is directly performed to render the operation screen based on the color pallet, display the operation screen of the channel serving as the operation target on the display part 16, and complete the selected channel rendering process.

When the process of step S14 is performed in the selected channel rendering process, the actual color of the color number designated to the invariable color in the color pallet selected in step S12 is reset to a default hue. Accordingly, the hue of an area in the operation screen in which the color number of the invariable color is designated is set to the default hue and is made invariable regardless of the operation target. Thus, for an area whose hue is made variable in the respective color pallet selected in step S12, the color of this area can be made invariable by so making the rendering settings of this area.

Upon determining that the invariable color is not designated in step S13, the hues of the common area of the displayed operation screen, the area of the knobs and buttons to be operated by the user, and the area for displaying the graph are invariable when the actual colors designated in the common area, the area of the knobs, fader and buttons to be operated by the user, and the area for displaying the graph in the color pallet selected in the step S12 are set to the same colors as those of another color pallet.

As described above, according to the invention, the audio signal processing system 1 is composed of the transmission line 3, the plurality of the audio signal processing units (DSP 13, DSP #1 and DSP #2) and the control unit 2. The transmission line 3 transmits a control signal and an audio signal. The plurality of signal processing units (DSP 13, DSP #1 and DSP #2) are connected to the transmission line 3. The each signal processing unit has a plurality of channels for applying a signal process to audio signals inputted thereto and outputting the audio signals to the transmission line 3 after the signal process is applied. The control unit 2 is connected to the transmission line 3 for operating a target channel belonging to one of the signal processing units by transmitting a control signal to the one signal processing unit through the transmission line 3. The control unit 2 has a display part 16 and a plurality of color pallets 30 which are different from each other and which are previously selected in correspondence to the plurality of the signal processing units for use with the display part 16. When the control unit 2 detects an instruction to display an operation screen of the target channel, the control unit 2 performs a process of rendering the operation screen of the target channel on the display part 16 with using the color pallet corresponding to the signal processing unit to which the target channel belongs, such that a background color of the operation screen (FIG. 3) of the target channel Ch 1 displayed on the display part 16 of the control unit 2 is different from a background color of an operation screen (FIG. 4) of another channel DSP #1 Ch 25 belonging to another signal processing unit.

The operation screen contains an image of a knob or button for operating the target channel over the background color of the operation screen, and a color of the image of the knob or button is set invariable although the background color of the operation screen is changed according to the color pallet of the signal processing unit to which the target channel belongs. The operation screen contains a common area over the background color of the operating screen, and a color of the common area is set common among the plurality of the signal processing units although the different color pallets are selected to the different signal processing units. The plurality of the signal processing units (DSP 13, DSP #1 and DSP #2) include an external signal processing unit DSP #1 or DSP #2 arranged separately from the control unit 2, and an internal signal processing unit DSP 13 integrated into the control unit 2.

Figure 10:
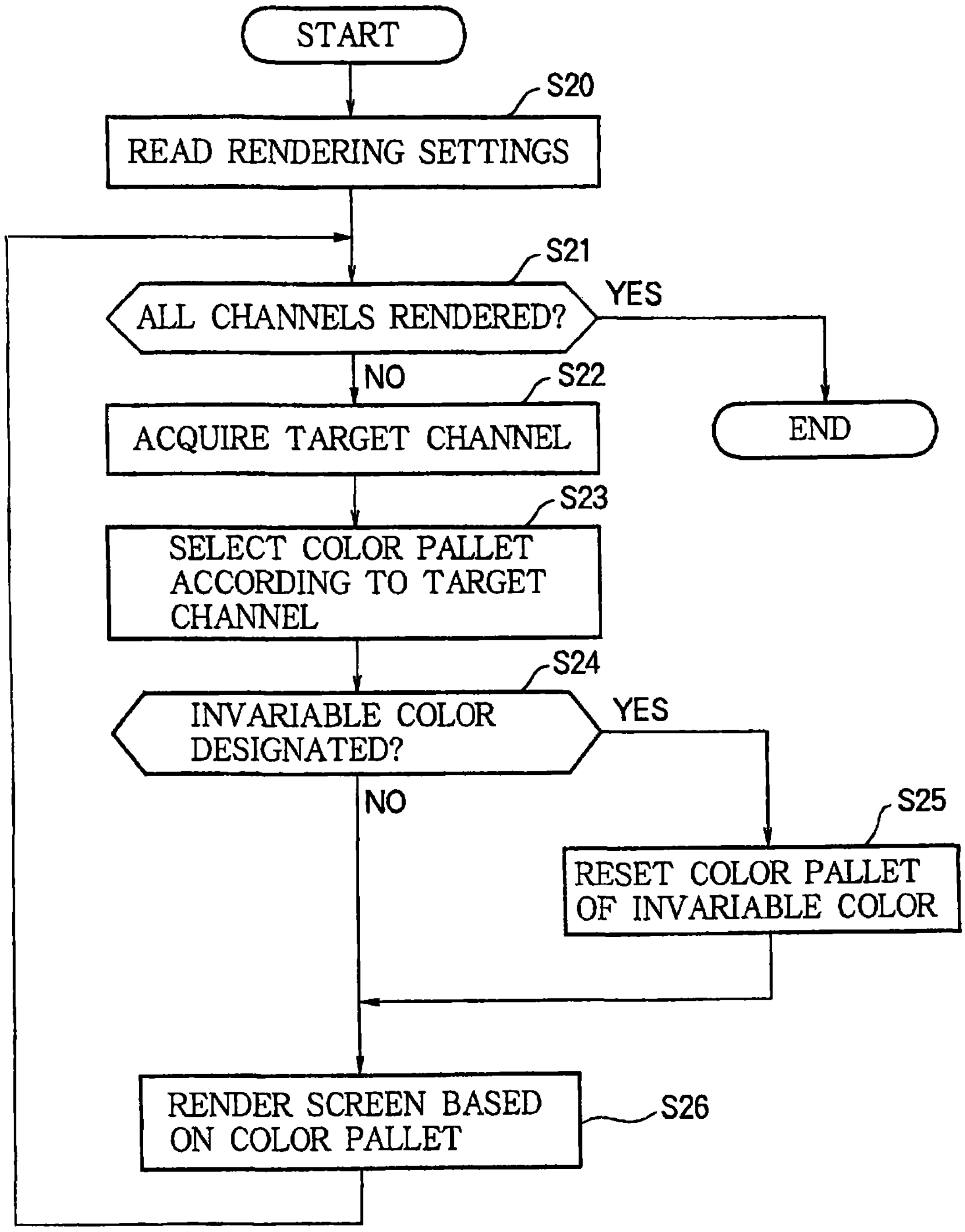
FIG. 10 is a flowchart of a multi-channel rendering process executed in the audio signal processing system of the present invention.

Next, FIG. 10 is a flowchart showing a multi-channel rendering process to be executed in the controller 2 to display the same operation screen shown in FIG. 5 on the display part 16 when an instruction to display a multi-channel operation screen is detected. Before the instruction to display the operation screen is made, a pallet selection process shown in FIG. 8 is executed and a color pallet for each signal processing unit is designated by the user.

When the instruction to display the multi-channel operation screen is detected, rendering settings is read which indicates whether the hue is variable/invariable according to color pallet information designated to each signal processing unit and in association with areas of an operation screen in step S20. In the rendering settings, an area whose hue is invariable can be expressed in a combination of the pallet number and the color number in the pallets 30. Subsequently, in step S21, it is determined whether or not all channels of a plurality of channels to be displayed are rendered. When NO is determined since some channel is not yet rendered in the process, step S22 is performed.

In step S22, one channel of non-rendered channels is acquired as a target channel. Next, in step S23, a color pallet of a pallet number designated to a signal processing unit to which the target channel belongs is selected. In step S24, it is determined whether or not a color number of an invariable color is designated in the selected color pallet in the rendering settings. Upon determining that the color number of the invariable color is designated, it branches to step S25 to reset the color pallet information (or actual color) of the color number designated to the invariable color in the selected color pallet to default color pallet information, and then proceeds to step S26. Upon determining that the color number of the invariable color is not designated, step S26 is directly performed to render the operation screen based on the color pallet, and return to step S21.

Herein, it is repeatedly determined whether or not all the channels of the target channels to be displayed are rendered. In this case, upon determining that a process of rendering all the channels is not performed, a process of rendering an operation screen of a total of two channels is performed by twice repeating steps S22 to S26. Until a process of rendering all the channels is completed, steps S21 to S26 are repeatedly performed. For example, when an operation screen of seven channels is displayed on the display part 16 as shown in FIG. 5, the process of steps S21 to S26 is repeated seven times. When the seventh process of step S26 is completed, the operation screen as shown in FIG. 5 is displayed on the display part 16. Upon determining that the process of rendering all the channels is completed in the eighth process of step S21, the multi-channel rendering process is completed.

When the process of step S25 is performed in the multi-channel rendering process, the actual color of the color number designated to the invariable color in the color pallet selected in step S23 is reset to the default hue. Accordingly, the hue of the area of the operation screen in which a color number of an invariable color is designated is set to the default hue and then is invariable regardless of a signal processing unit. Thus, also in an area whose hue is variable in the color pallet selected in step S23, the color may be made invariable by making rendering settings of this area to this effect.

Upon determining that the invariable color is not designated in step S24, the hues of the common area, the area of the knobs and buttons to be operated by the user, and the area for displaying the graph may be still made invariable when the actual colors designated to the common area of the displayed operation screen and the area of the knobs, fader and buttons to be operated by the user, and the area for displaying the graph in the color pallet selected in the step S23 are set to the same colors as those of another color pallet.

As described above, in the audio signal processing system according to the invention, the transmission line 3 transmits a control signal and an audio signal. The plurality of signal processing units (DSP 13, DSP #1 and DSP #2) are connected to the transmission line 3. Each signal processing unit has a plurality of channels for applying a signal process to audio signals inputted thereto and outputting the audio signals to the transmission line 3 after the signal process is applied. The control unit 2 is connected to the transmission line 3 for operating one or more channels belonging to one or more signal processing units by transmitting thereto control signals through the transmission line 3. The control unit 2 has the display part 16 and the plurality of color pallets 30 which are different from each other and which are previously selected in correspondence to the plurality of the signal processing units (DSP 13, DSP #1 and DSP #2) for use with the display part 16. When the control unit 2 detects an instruction to display an operation screen on the display part 16 for operating target channels belonging to different signal processing units, the control unit 2 performs a process of rendering the target channels in the operation screen with using different color pallets corresponding to the different signal processing units to which the target channels belong, such that background colors of target channels belonging to different signal processing units are made different when all of the target channels are displayed on the display part 16 of the control unit 2. As illustrated in FIG. 5, the operation screen contains an image of a knob or button for each of the target channels, and a color of the image of the knob or button of all the target channels is invariable although the background color of the target channels is made different. The operation screen contains a common area in each of the target channels, and a color of the common area is set common among the target channels although different color pallets are selected to the different signal processing units.

In the present invention as described above, when extension DSPs more than two extension DSPs are connected to the transmission line 3, the pallets 30 have a color pallet selected by the user for each of the extension DSPs more than the two extension DSPs. In an operation screen of a channel serving as an operation target, the hues of the common area set for respective operation screens of a plurality of channels, the area of the knobs and buttons to be operated by the user, and the area for displaying the graph are made invariable. Without setting the hues of all these areas to be invariable, the hue of at least one of the areas may be invariable or the hues of all the areas of the operation screen may be variable according to signal processing units.

A filter process for color information may be performed with software in place of preparing the pallets 30, such that the hue of at least one desired area is made variable in the operation screen.

What is claimed is:

1. An audio signal processing system comprising:

a transmission line that transmits a control signal and an audio signal;

a plurality of signal processing units connectable to the transmission line, each signal processing unit having a plurality of channels for applying a signal process to audio signals inputted thereto and outputting the audio signals to the transmission line after the signal process is applied; and a control unit connectable to the transmission line for operating a target channel belonging to one of the signal processing units by transmitting a control signal to the one signal processing unit through the transmission line, wherein the control unit has a display part and a plurality of color pallets that are different from each other and previously set in correspondence to the plurality of the signal processing units for use with the display part, wherein the control unit is configured to:

detect an instruction to display an operation screen of the target channel;

select, in response to the detected instruction, the color pallet corresponding to the signal processing unit to which the target channel belongs; and perform a process of rendering the operation screen of the target channel on the display part using the selected color pallet, so that a background color of the operation screen of the target channel displayed on the display part of the control unit is different from a background color of an operation screen of another channel belonging to another signal processing unit.

2. The audio signal processing system according to claim 1, wherein the operation screen contains an image of a knob or button for operating the target channel over the background color of the operation screen, and a color of the image of the knob or button is set invariable although the background color of the operation screen is changed according to the selected color pallet.

3. The audio signal processing system according to claim 1, wherein the operation screen contains a common area over the background color of the operating screen, and a color of the common area is set common among the plurality of the signal processing units although the different color pallets are selected to the different signal processing units.

4. The audio signal processing system according to claim 1, wherein the plurality of the signal processing units include an external signal processing unit arranged separately from the control unit, and an internal signal processing unit integrated into the control unit.

5. An audio signal processing system comprising:

a transmission line that transmits a control signal and an audio signal;

a plurality of signal processing units that are connectable to the transmission line, each signal processing unit having a plurality of channels for applying a signal process to audio signals inputted thereto and outputting the audio signals to the transmission line after the signal process is applied; and a control unit that is connectable to the transmission line for operating one or more channels belonging to one or more signal processing units by transmitting thereto control signals through the transmission line, wherein the control unit has a display part and a plurality of color pallets that are different from each other and that are previously set in correspondence to the plurality of the signal processing units for use with the display part, wherein the control unit is configured to:

detect an instruction to display an operation screen on the display part for operating target channels belonging to different signal processing units;

select, in response to the detected instruction, the color pallet corresponding to the signal processing unit to which the target channel belongs; and perform a process of rendering the target channels in the operation screen using different selected color pallets, so that background colors of target channels belonging to different signal processing units are different when all of the target channels are displayed on the display part of the control unit.

6. The audio signal processing system according to claim 5, wherein the operation screen contains an image of a knob or button for each of the target channels, and a color of the image of the knob or button of all the target channels is invariable although the background color of the target channels is different.

7. The audio signal processing system according to claim 5, wherein the operation screen contains a common area in each of the target channels, and a color of the common area is set common among the target channels although different color pallets are selected to the different signal processing units.

8. The audio signal processing system according to claim 5, wherein the plurality of the signal processing units include an external signal processing unit arranged separately from the control unit, and an internal signal processing unit integrated into the control unit.

* * * * *